United States Patent
Asai et al.

(10) Patent No.: US 7,646,825 B2
(45) Date of Patent: Jan. 12, 2010

(54) IMPULSE GENERATING DEVICE, COMMUNICATION DEVICE, AND A COMPUTER-READABLE RECORDING MEDIUM RECORDING AN IMPULSE CONTROL PROGRAM THEREON

(75) Inventors: Masafumi Asai, Kawasaki (JP); Hidenori Sekiguchi, Kawasaki (JP); Akira Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 671 days.

(21) Appl. No.: 11/403,854

(22) Filed: Apr. 14, 2006

(65) Prior Publication Data
US 2007/0110182 A1 May 17, 2007

(30) Foreign Application Priority Data
Nov. 17, 2005 (JP) ............................. 2005-332700

(51) Int. Cl.
*H04L 27/10* (2006.01)

(52) U.S. Cl. ...................... 375/281; 375/219; 375/260; 375/295

(58) Field of Classification Search ................. 375/281, 375/295, 219, 260
See application file for complete search history.

(56) References Cited

U.S. PATENT DOCUMENTS

| 6,560,463 | B1 | 5/2003 | Santhoff | 455/522 |
| 6,937,667 | B1 | 8/2005 | Fullerton et al. | 375/295 |
| 7,209,523 | B1 * | 4/2007 | Larrick et al. | 375/295 |
| 7,403,575 | B2 * | 7/2008 | Gehring et al. | 375/308 |

FOREIGN PATENT DOCUMENTS

| JP | 8-5732 | 1/1996 |
| JP | 2003-515974 | 5/2003 |
| JP | 2003-174368 | 6/2003 |
| JP | 2003-529273 | 9/2003 |
| JP | 2004-510388 | 4/2004 |
| JP | 2005-55302 | 3/2005 |
| WO | WO 01/39451 | 5/2001 |

OTHER PUBLICATIONS

R. Roberts, "Harris TG4a CFP Proposal Response", IEEE: The Institute of Electrical and Electronic Engineers, Jan. 2005, http://grouper.ieee.org/groups/802/15/pub/05/15-05-0006-01-004a-harris-cfp-response.ppt.

* cited by examiner

*Primary Examiner*—Ted M Wang

(57) ABSTRACT

To realize variable control of the output value of impulses with a simple construction, the present device includes an impulse generating unit which generates impulses; and a control unit which controls an output value of impulses output from the impulse generating unit by changing an input signal that is input to the impulse generating unit for generating impulses.

14 Claims, 10 Drawing Sheets

FIG. 6

| | INPUT PULSE SETTING | |
|---|---|---|
| OUTPUT VALUE (CREST VALUE)[V] | ON TIME [nsec] | VOLTAGE [V] |
| 2.9 | 100 | 3.00 |
| 2.06 | 180 | 3.00 |
| 1.46 | 180 | 1.32 |
| 1.03 | 180 | 1.13 |
| 0.73 | 180 | 1.05 |
| 0.52 | 180 | 1.00 |

41

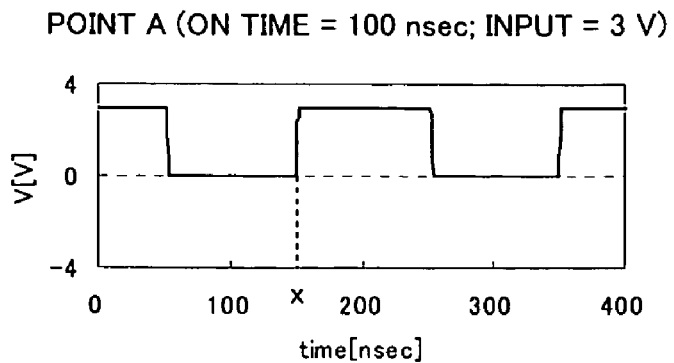
FIG. 8(a) POINT A (ON TIME = 100 nsec; INPUT = 3 V)
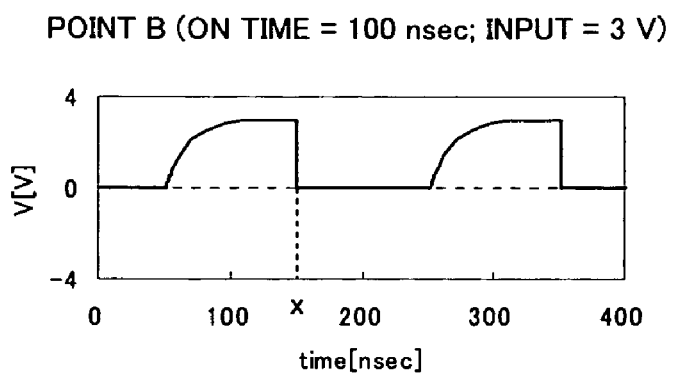
FIG. 8(b) POINT B (ON TIME = 100 nsec; INPUT = 3 V)
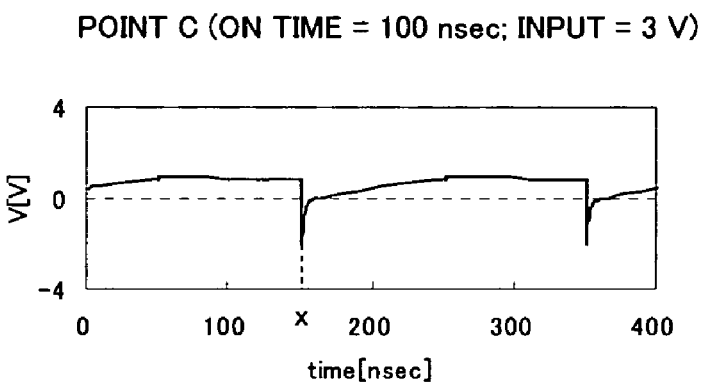
FIG. 8(c) POINT C (ON TIME = 100 nsec; INPUT = 3 V)
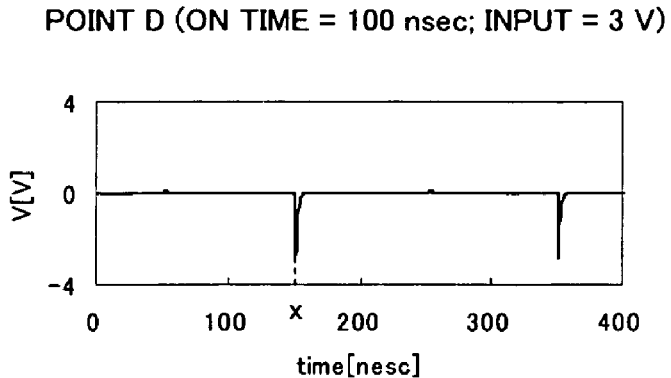
FIG. 8(d) POINT D (ON TIME = 100 nsec; INPUT = 3 V)

POINT A (ON TIME = 180 nsec; INPUT = 1.2 V)

POINT B (ON TIME = 180 nsec; INPUT = 1.2 V)

POINT C (ON TIME = 180 nsec; INPUT = 1.2 V)

POINT D (ON TIME = 180 nsec; INPUT = 1.2 V)

IMPULSE GENERATING DEVICE, COMMUNICATION DEVICE, AND A COMPUTER-READABLE RECORDING MEDIUM RECORDING AN IMPULSE CONTROL PROGRAM THEREON

BACKGROUND OF THE INVENTION

1) Field of the Invention

The present invention relates to an art for controlling the output value of impulses when the impulses are generated.

2) Description of the Related Art

Recently, a lot of studies have been made for putting the UWB (Ultra WideBand)-impulse radio communication scheme positively employing an impulse signal (impulse waveform) to practical use.

This UWB-impulse radio communication is a communication scheme in which extremely short impulses are used in place of a carrier wave. Use of the impulses brings about a considerably wide band spectrum, but because of low spectrum density, there is very little interference with other systems.

Two further differences from communication using a carrier are that the UWB-impulse radio communication does not perform power transmission except at the time of impulse transmission, and that it also has an advantage of low power consumption.

When impulses are generated, a circuit employing a step recovery diode (also called a snap-off diode) is used for generating impulses. Under a state where forward voltage is applied to the step recovery diode, reverse voltage is applied thereto, thereby obtaining a voltage waveform with a sharp rise and an extremely high frequency component of several GHz (approximately 20 GHz at maximum). The voltage waveform is then subjected to differentiation and waveform shaping to obtain an impulse.

There has been an art for adjusting the output of impulses generated by the impulse generating circuit by providing a digital control attenuator (digital variable attenuator; for example, an attenuator) at a stage after an impulse generating circuit (for example, see the following patent document 1), and also an art for making the output of an impulse generating circuit constant by feedback control (for example, see the following patent document 2).

The permissive radiation power of UWB radio communication is stipulated so that the peak radiation power and the average radiation power remain below a specified value. For example, according to the FCC (Federal Communications Commission), it is stipulated that the average radiation power of impulses is −41.3 dBm/MHz or lower, and that the peak radiation power of 33.98 dBm/MHz (it is stipulated that +0 dBm/MHz is obtained with a resolution of 50 MHz, and these values are obtained by the conversion formula with a resolution of 1 MHz) within a range of 3.1 GHz and 10.6 GHz. This is called an FCC mask.

Accordingly, in cases where the output value (crest value; hereafter also simply called an output) of impulses is raised for long distance communication, for example, it is necessary to reduce the radiation frequency of impulses to observe the reference value of the mean radiation power. On the other hand, in cases where the radiation frequency is increased to raise the communication speed in short distance communication, it is necessary to reduce the output value of impulses, to observe the reference value of the mean radiation power.

In other words, when the impulse output is increased while the peak value limitation is satisfied, it is possible to lengthen the communication distance by reducing the radiation frequency of impulses. In contrast, when the communication distance is short, by increasing the radiation frequency of impulses, and by decreasing the output of each impulse, high-speed communication becomes available.

The UWB frequency band is also used by other radio communication systems, and it is thus preferable that unnecessarily large-power radiation is avoided to the greatest extent possible for the purpose of avoiding interference.

In this manner, in the UWB radio communication system, the necessity for changing the radiation frequency and the output value of impulses is high, and thus, it is desirable that the mechanism for positively changing the output of impulses is realized by a construction that is as inexpensive and simple as possible.

However, the above-described art needs a digital control attenuator which is relatively expensive. In addition, the digital control attenuator raises the necessity for an interface (or a control circuit) for controlling thereof, and thus manufacturing costs are increased and the construction becomes complicated.

[Patent Document 1] Published Japanese Translation of a PCT Application No. 2003-515974

[Patent Document 2] Published Japanese Translation of a PCT Application No. 2003-529273

SUMMARY OF THE INVENTION

With the foregoing problems in view, it is an object of the present invention to realize variable control of the output value of impulses with a simple construction.

In order to accomplish the above object, according to the present invention, there is provided an impulse generating device, comprising: an impulse generating unit which generates impulses; and a control unit which controls an output value of impulses output from the impulse generating unit by changing an input signal that is input to the impulse generating unit for generating impulses.

As a preferred feature, the control unit controls the output value of the impulses by changing an ON/OFF time of the input signal.

As another preferred feature, the control unit controls the output value of the impulses by changing voltage of the input signal.

As a generic feature, there is provided a communication device used in a radio communication system which performs radio communication by a UWB (Ultra Wideband)-impulse radio scheme, the device comprising: an impulse generating unit which generates impulses used in the radio communication; and a control unit which controls an output value of impulses output from the impulse generating unit by changing an input signal that is input to the impulse generating unit for generating impulses.

As another generic feature, there is provided a recording medium recording therein an impulse control program for a computer to realize a function of controlling an output value of impulses generated by an impulse generating device that includes the impulse generating unit, wherein the program instructs the computer to function as a control unit which controls an output value of impulses output from the impulse generating unit by changing an input signal that is input to the impulse generating unit for generating impulses.

The magnetic recording apparatus and the integrated circuit of the present invention guarantee the following advantageous results. According to the present invention, the control unit changes a pulse input signal input to the impulse generating unit, thereby controlling the output value of impulses generated by the impulse generating unit, so that output adjustment for the impulse generating unit can be performed in a stage before the impulse generating unit only by changing the input signal. Therefore, there is no need for a mechanism, such as a digital control attenuator, for adjusting an output of the impulse generating unit in a stage after the impulse generating unit. Hence, it is possible to control the output value of impulses with a significantly simple construction.

Other objects and further features of the present invention will be apparent from the following detailed description when read in conjunction with the accompanying drawings.

BRIEF DESCRIPTION OF THE DRAWINGS

FIG. 6 is a table which is held by a control unit of the impulse generator of the communication device according to the present embodiment;

FIG. 8(a) through FIG. 8(d) are diagrams each showing change in voltage over time in accordance with a pulse input signal in the circuit of FIG. 7; FIG. 8(a) shows change in voltage at point A of the circuit; FIG. 8(b) shows change in voltage at point B of the circuit; FIG. 8(c) shows change in voltage at point C of the circuit; FIG. 8(d) shows change in voltage at point D of the circuit;

FIG. 9(a) shows change in voltage at point A of the circuit; FIG. 9(b) shows change in voltage at point B of the circuit; FIG. 9(c) shows change in voltage at point C of the circuit; FIG. 9(d) shows change in voltage at point D of the circuit;

FIG. 10(a) shows change in voltage at point A of the circuit; FIG. 10(b) shows change in voltage at point B of the circuit; FIG. 10(c) shows change in voltage at point C of the circuit; FIG. 10(d) shows change in voltage at point D of the circuit.

DESCRIPTION OF THE PREFERRED EMBODIMENT(S)

One preferred embodiment of the present invention will now be described with reference to the relevant accompanying drawings.

[1] One Preferred Embodiment

Figure 1:
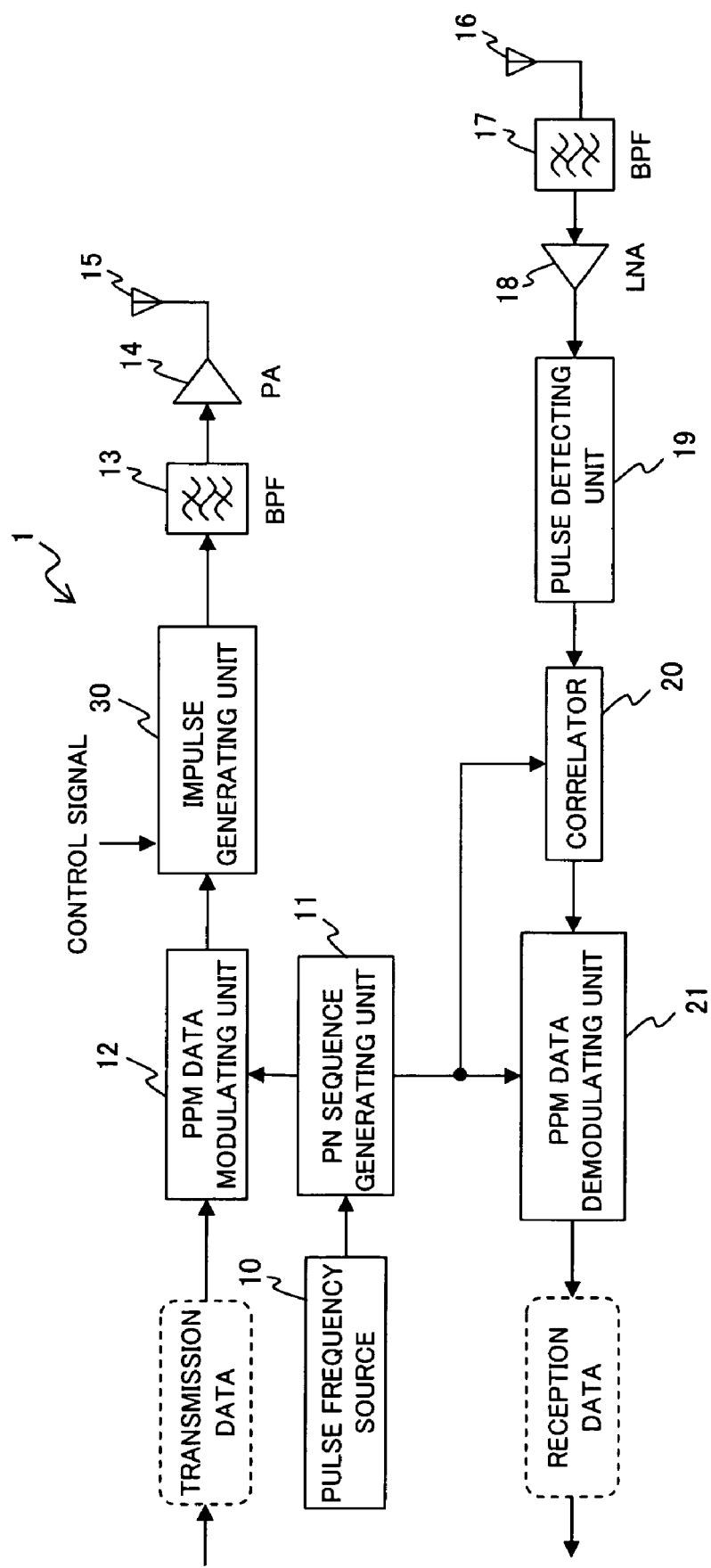
FIG. 1 is a block diagram showing a construction of a communication device according to one preferred embodiment of the present invention.

First of all, referring to the block diagram of FIG. 1, a description will be made hereinbelow of a construction of a communication apparatus according to one preferred embodiment of the present invention. As shown in FIG. 1, the communication apparatus [UWB (Ultra WideBand)-impulse radio apparatus] 1 includes: a pulse frequency source 10; a PN (Pseudo Noise) sequence generating unit 11; a PPM (Pulse Position Modulation) data modulating unit 12; an impulse generator (impulse generating device) 30; a BPF (Band Pass Filter) 13; PA (Power Amplifier) 14; a transmission antenna 15; a reception antenna 16; a BPF 17; an LNA (Low Noise Amplifier) 18; a pulse detecting unit 19; a correlator 20; and a PPM data demodulating unit 21.

These pulse frequency source 10, PN sequence generating unit 11, PPM data modulating unit 12, impulse generator 30, BPF 13, PA 14, transmission antenna 15, form a transmission mechanism for sending data. The reception antenna 16, BPF 17, LNA 18, pulse detecting unit 19, correlator 20, PPM data demodulating unit 21 is a reception mechanism for receiving data.

The communication device 1 is communicably connected to another communication device having the same or approximately the same construction as that of the communication device 1, and these communication devices are capable of communicating with one another by radio communication of the UWB-impulse radio communication scheme. The present communication device 1 is capable of transceiving data with another communication apparatus with the same construction using an impulse signal (hereinafter also called impulses).

Here, referring to FIG. 2, a description will be made hereinbelow of a data transceiving method (UWB-impulse radio communication scheme) using impulses, performed on the present communication device 1.

Figure 2:
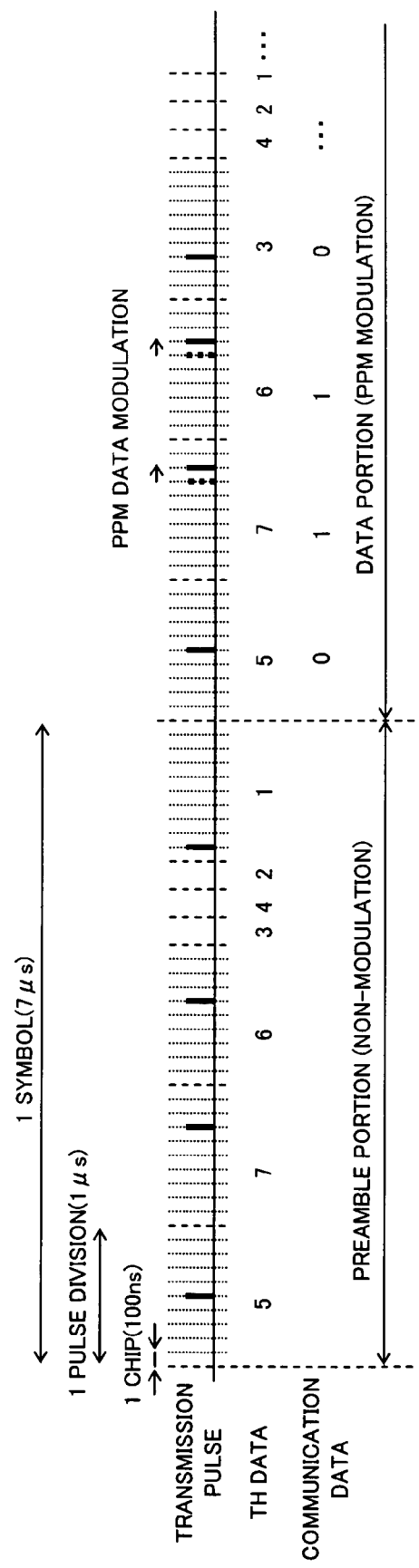
FIG. 2 is a diagram for describing radio communication processing performed on the communication apparatus of FIG. 1 using an impulse signal.

As shown in FIG. 2, the transmission data sent from the communication device 1 is time-hopped by an 8-value (that is, eight values from 0 through 7) RS sequence, which is a type of PN sequence, and has also been subjected to data modulation by the Pulse Position Modulation (PPM).

In cases where the minimum time unit for changing the pulse position, 1 chip, is 100 ns, if "5763421" is used as the RS sequence, in seven pulse divisions [equal to 1 symbol (7 μs)] (1 pulse division is 1 μs) of a preamble portion (data is not modulated) for synchronization of transmission data (TH data), the initial pulse is time-hopped at the position of 500 ns; the next pulse, at 700 ns; the next pulse, at 600 ns; the next pulse, at 300 ns; the next pulse, at 400 ns; the next pulse, at 200 ns; the next pulse, at 100 ns.

Figure 3:
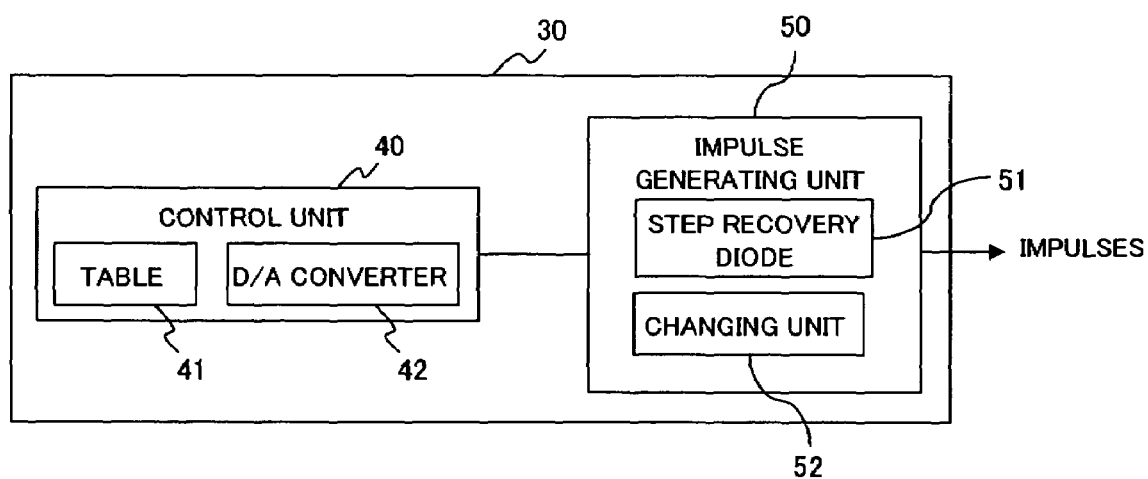
FIG. 3 is a block diagram showing a construction of an impulse generator of a communication device according to the present embodiment.

Here, in FIG. 3, for simplification of illustration, the 4th to the 6th symbols from the leading end (the left end in the drawing) of the preamble portion are omitted from illustration. Further, in FIG. 2, the vertical thick solid line indicates that pulses are time-hopped.

Likewise, the data portion (communication data) following the preamble portion is time-hopped by the RS sequence.

When "1" is indicated in each pulse division of the data portion, a pulse is shifted backwards by one chip in comparison with the position time-hopped in the preamble portion. Thus, so-called pulse position modulation is performed, thereby expressing data of "1". In this manner, in the UWV-impulse radio communication scheme (the present communication device 1), data transceiving by use of impulses is realized by transceiving a data portion which has been subjected to pulse position modulation.

For example, the data portion is "0110000", the RS sequence of "5763421" indicated by the preamble portion is modulated into "5873421" in the data portion. In the seven pulse divisions, the initial pulse is time-hopped at the position of 500 ns; the next pulse, at 800 ns; the next pulse, 700 ns; the next pulse, at 300 ns; the next pulse, 400 ns; the next pulse, at 200 ns; the next pulse, at 100 ns.

That is, in the second pulse division indicating "1", the pulse is hopped at the position of 700 ns in the preamble portion, while the pulse is hopped at the position of 800 ns (backwards by one chip) in the data portion. Likewise, in the third pulse division indicating "1", the pulse is hopped at the position of 600 ns in the preamble portion, while the pulse is hopped at the position of 700 ns (backwards by one chip) in the data portion. In FIG. 2, for simplification of illustration, the 5th through the 7th symbols from the leading end of the data portion are omitted from illustration.

Here, referring to FIG. 1, a description will be made in detail of each constituent of the communication device 1. The pulse generating source 10 generates clocks. The pulse frequency source 10 is controlled by a control circuit (not illustrated), for example, to generate clocks in such a manner that a 1-chip time of generated impulses is a desired time.

The PN sequence generating unit 11 generates the above-described RS sequence.

The PPM data modulating unit 12 performs PPM modulation in accordance with transmission data (that is, data of "1" and "0").

The impulse generator 30 generates extremely fine impulses at the rise of pulses using a step recovery diode 51 (see FIG. 3 which will be detailed later). The impulse generator 30 generates impulses on the basis of a pulse input signal which is based on data modulated by the PPM data modulating unit 12, and on the basis of a control signal for controlling an output value (peak value; amplitude) of impulses from a control circuit (not illustrated).

The BPF 13 removes specified spectrum of the impulses generated by the impulse generating unit 30.

The impulses generated by the impulse generating unit 30 have a significantly wide band. However, for the purpose of making the impulse adapt to the FCC mask, the impulses generated by the impulse generating unit 30 are made to pass through the BPF 13 of 3.1 GHz through 10.6 GHz, so that unnecessary spectrum lower than 3.1 GHz or higher than 10.6 GHz are removed.

In the present communication device 1, the impulses, having passed through the BPF 13, are amplified by the PA 14 and are then sent out from the transmission antenna 15.

Next, a description will be made hereinbelow of each constituent of a receiver system of the communication device 1. When the reception antenna 16 receives impulses sent from another communication device, the BPF 17 removes unnecessary spectrum.

The LNA 18 amplifies the received impulses.

The pulse detecting unit 19 detects the impulses amplified by the LNA 18 as received data. More specifically, the pulse detecting unit 19 has an envelop detecting circuit (not illustrated) formed by a diode and a comparator (not illustrated), and detects pulses by means of this envelop detecting circuit and comparator.

The correlator 20, which detects a preamble portion from pulses detected by the pulse-detecting unit 19, has a digital matched filter (not illustrated). By comparing pulses detected by the pulse-detecting unit 19 with an RS sequence generated by the PN sequence generating-unit 11, matching (correlation) between the pulses and the RS sequence is examined to extract a preamble portion from the pulses.

After the correlator 20 detects a preamble portion, the PPM demodulating unit 21 considers that the synchronization has been established, and the PPM of a data portion following the preamble portion is demodulated, thereby generating received data.

In this instance, in the communication device 1, the transmission antenna 15 and the reception antenna 16 are separately provided. However, only one antenna can be provided and can be commonly used both as a transmitter antenna and a receiver antenna. Further, the BPF 13 and the BPF 17 are separately provided for a transmitter system and a receiver system. However, only one BPF can also be provided and commonly used for transmission and reception.

Here, referring to the block diagram shown in FIG. 3, a description will be made of a construction of the impulse generator 30 of the present communication device 1.

As shown in FIG. 3, the impulse generator 30 includes a control unit 40 and an impulse generating unit 50.

The control unit 40 controls the output value (peak value) of impulses output from the impulse generating unit 50 by changing a pulse input signal (input signal; input pulses) for generating impulses which are input to the impulse generating unit 50 that generates impulses.

That is, the control unit 40 controls an output value of impulses generated by the impulse generating unit 50, by changing at least either an ON/OFF time or voltage of the pulse input signal modulated by the PPM data modulating unit 12 based on a control signal indicating an output value of desired impulses, which control signal is output from a control circuit (not illustrated).

The ON/OFF time of a pulse input signal changed by the control unit 40 means an ON time or an OFF time in a specified time unit (that is a 1-chip time which is the minimum time unit for impulse generation). Accordingly, specifying the ON time will also cause the OFF time to be specified, and thus, the ON/OFF time will be simply called an ON time in the following description.

Here, referring to FIG. 4 and FIG. 5, a description will be made of a relationship between the ON time and voltage of a pulse input signal changed by the control unit 40 and the output value of impulses generated by the impulse generating unit 50. Here, the relationship shown in FIG. 4 and FIG. 5 is that when the impulse generating unit 50 outputs impulses every 200 nsec.

Figure 4:
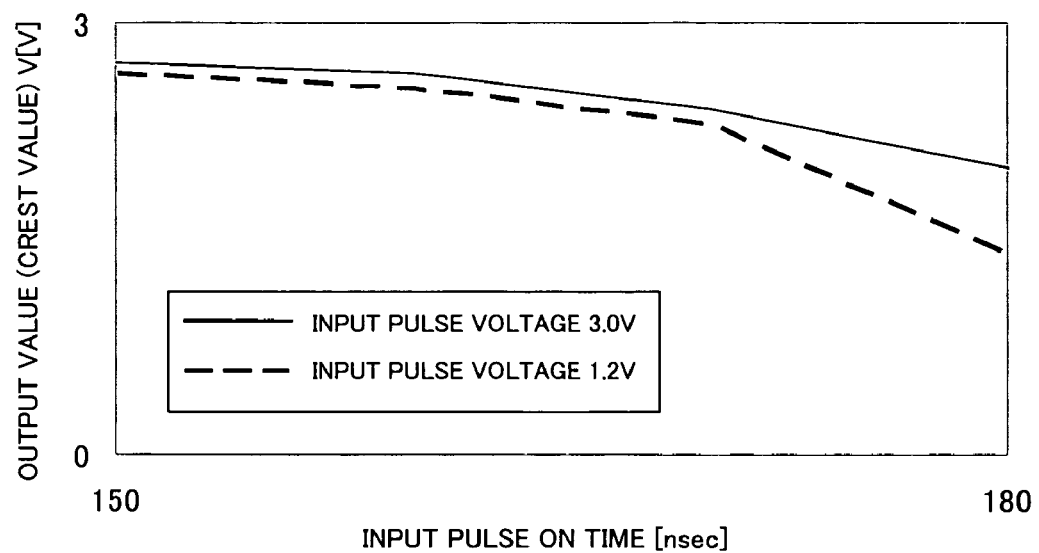
FIG. 4 is a graph indicating the output value of impulses generated by an impulse generating unit according to an ON time of an impulse input signal input to the impulse generating unit of the communication device according to the present embodiment.

FIG. 4 shows the output value of impulses generated by the impulse generating unit 50 when the ON time (input pulse ON time) is varied in a range of 150 nsec through 180 nsec where the voltage of a pulse input signal (input pulse voltage) is 3V and 1.2V. FIG. 5 shows the output value of impulses generated by the impulse generating unit 50 when the voltage of a pulse input signal is varied in a range of 0.8 V through 1.2 V.

As shown in FIG. 4, according to the impulse generating unit 50 [concretely, a circuit construction shown in FIG. 7 (will be detailed later)] of the impulse generator 30, in both cases where the voltage is 3 V and 1.2 V, the longer the ON time of the pulse input signal, the lower the output value of generated impulses.

Figure 5:
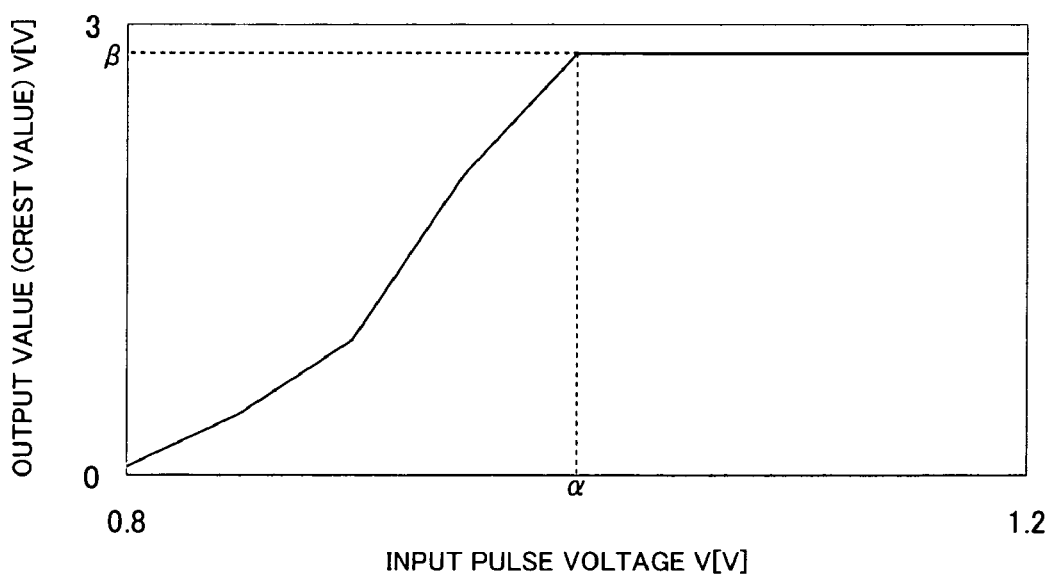
FIG. 5 is a graph indicating the output value of impulses generated by an impulse generating unit according to voltage of an impulse input signal input to the impulse generating unit of the communication device according to the present embodiment.

As shown in FIG. 5, according to the impulse generating unit 50, in a range of pulse input signal voltages of 0.8 V through α V, as the voltage increases, the output value of impulses increases. However, after reaching a V, the output value of impulses no longer increases even when the voltage of the pulse input signal increases, and takes a fixed value of β.

Utilizing such a relationship between the ON time and the voltage of a pulse input signal input to the impulse generating unit 50 and the output value of impulses generated by the impulse generating unit 50, the control unit 40 controls the output value of impulses generated by the impulse generating unit 50, by changing the ON time and/or the voltage of the pulse input signal.

More specifically, as shown in FIG. 3, the control unit 40 has a table 41 and a D/A (Digital/Analog) converter 42.

The table 41 is constructed as shown in FIG. 6, and shows association between the output value of impulses from the impulse generating unit 50 and the ON time and the voltage of an input signal (designated as "input pulse setting" in the drawing). In this instance, the table 41 of FIG. 6 is a table for a case where the impulse generating unit 50 generates impulses every 200 nsec.

Upon receipt of a control signal indicating a desired output value of impulses, the control unit 40 changes the ON time and/or the voltage of an pulse input signal from the PPM data modulating unit 12 based on the table 41, and generates a pulse input signal to be input to the impulse generating unit 50.

More specifically, if the control signal is a signal input to the control unit 40 to realize an output value of impulses of 2.9 V, the control unit 40 sets the ON time of the pulse input signal to 100 nsec based on the table 41, and also sets the voltage of the pulse input signal to 3 V.

In addition, if the control signal is a signal input to the control unit 40 to realize an output value of impulses of 2.06 V, the control unit 40 sets the ON time of the pulse input signal to 180 nsec based on the table 41, and also sets the voltage of the pulse input signal to 3 V.

Further, if the control signal is a signal input to the control unit 40 to realize an output value of impulses of 1.46 V, the control unit 40 sets the ON time of the pulse input signal to 180 nsec based on the table 41, and also sets the voltage of the pulse input signal to 1.32 V.

Still further, if the control signal is a signal input to the control unit 40 to realize an output value of impulses of 1.03 V, the control unit 40 sets the ON time of the pulse input signal to 180 nsec based on the table 41, and also sets the voltage of the pulse input signal to 1.13 V.

Yet further, if the control signal is a signal input to the control unit 40 to realize an output value of impulses of 0.73 V, the control unit 40 sets the ON time of the pulse input signal to 180 nsec based on the table 41, and also sets the voltage of the pulse input signal to 1.05 V.

Furthermore, if the control signal is a signal input to the control unit 40 to realize an output value of impulses of 0.52 V, the control unit 40 sets the ON time of the pulse input signal to 180 nsec based on the table 41, and also sets the voltage of the pulse input signal to 1.00 V.

The D/A converter 42 converts digital data to analogue data, so that the control unit 40 inputs a pulse input signal having been set based on the table 41 to the impulse generating unit 50.

On the basis of a pulse input signal input from the control unit 40, the impulse generating unit 50 generates impulses, and includes, for example, a step recovery diode 51 and a changing unit 52.

That is, under a state where forward voltage is applied to a step recovery diode 51 (application of forward bias), the impulse generating unit 50 applies reverse voltage, thereby obtaining a voltage waveform with a sharp rise and an extremely high frequency component. The voltage waveform is then subjected to differentiation and waveform shaping to obtain an impulse.

The changing unit 52 changes reverse voltage which is input at the time of switching from forward bias application to reverse bias application to the step recovery diode 51, in accordance with the impulse input signal (in particular, the ON time and the voltage of the pulse input signal) input from the control unit 40.

Figure 7:
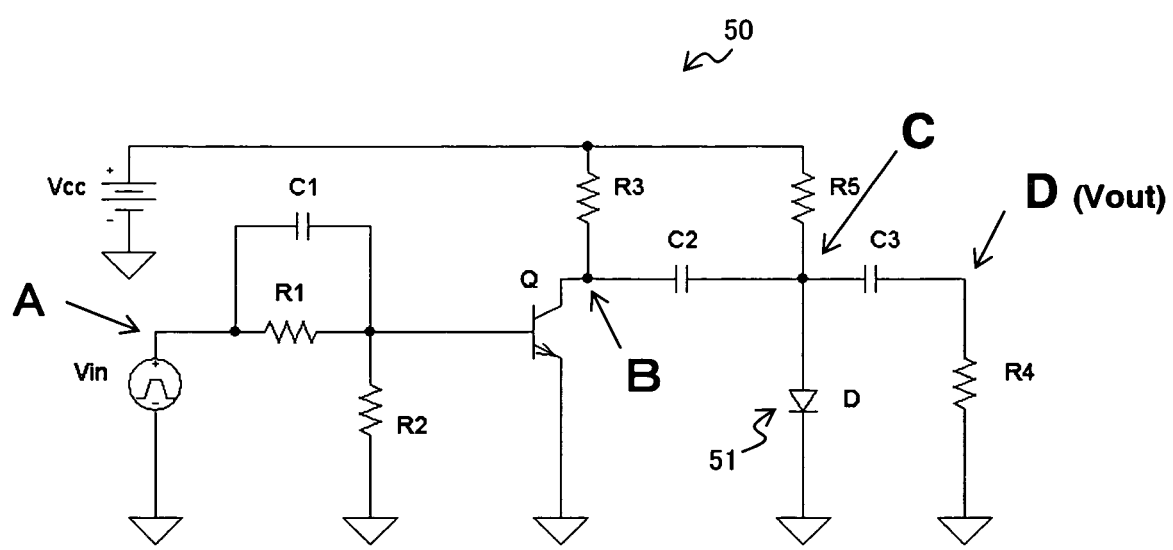
FIG. 7 is a diagram showing a circuit construction of an impulse generating unit of the impulse generator of the communication device according to the present embodiment.

FIG. 7 shows a circuit construction of an impulse generating unit 50 including a step recovery diode 51 and a changing unit 52. As shown in FIG. 7, the impulse generating unit 50 includes: a source voltage Vcc; resistors R1 through R5; capacitors C1 through C3; a transistor Q; and a step recovery diode 51.

Here, taking an example where the ON time of a pulse input signal input to the impulse generating unit 50 is 100 nsec and where the source voltage Vcc is 3V, a description will be made hereinbelow of an operation of the present circuit. FIG. 8(*a*) through FIG. 8(*d*) each show change in voltage at points A through D of FIG. 7 in the above example, and these drawings are also used to described the operation of the present circuit.

FIG. 8(*a*) shows change in voltage at point A; FIG. 8(*b*) shows change in voltage at point B; FIG. 8(*c*) shows change in voltage at point C (that is, change in reverse voltage applied to the step recovery diode 51); FIG. 8(*d*) shows change in voltage at point D (that is, change in the output value of an impulse output from the impulse generating unit 50).

When the input Va at point A changes from 3 V to 0 V [see FIG. 8(*a*)], electric current flows from the source voltage (transistor) Vcc. The current passes through the resistor R3, and an electric charge is accumulated in the capacitor C2. As a result, the electric potential Vb at point B increases [see FIG. 8(*b*)].

On the other hand, the electric potential Vc at point C is made into a state in which an approximately constant voltage Vbias, which depends on the source voltage Vcc, the resistor R5, and the characteristic of the step recovery diode 51 itself, is applied [see FIG. 8(*c*)].

Then, when the input Va changes into 3 V at an approximate timing [see time x in FIG. 8(*a*)], the voltage Vb at point B is decreased to approximately 0 V [see time x of FIG. 8(*b*)], and the electric potential Vc at point C reveals change in voltage to be the same as that revealed at point B [see time x of FIG. 8(*c*)].

As a result, reverse bias voltage is applied to the step recovery diode 51.

In this instance, reverse current temporarily flows in the step recovery diode 51, and then, electric current stops flowing during an extremely short time period due to the characteristics of the step recovery diode 51. At this time, extremely steep voltage change having a frequency component of GHz order or greater appears [see time x of FIG. 8(*d*)].

This is subjected to removal of a direct current component therefrom by the capacitor C3, and to waveform shaping. A considerably sharp impulse is resultantly obtained.

In this instance, by adjusting electric charge accumulated in the capacitor C2 with the ratio of the ON/OFF times of the transistor Q, it is possible to change the peak value of the impulse output (the output value of impulses).

In this manner, in the impulse generating unit 50, an output at point D changes depending upon the ON/OFF duty of an input waveform (input pulse) and a voltage value at point A.

Figure 9A:
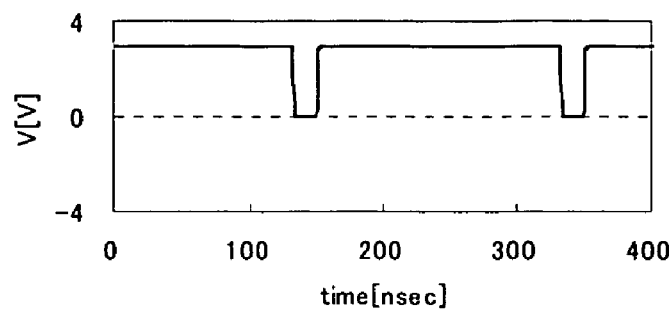
FIG. 9(a) through FIG. 9(d) are diagrams each showing change in voltage over time in accordance with a pulse input signal in the circuit of FIG. 7.
Figure 9B:
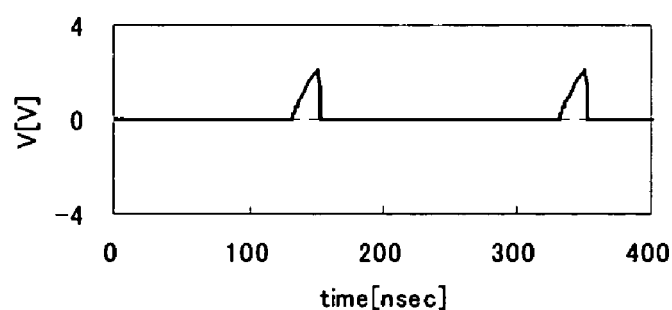
Figure 9C:
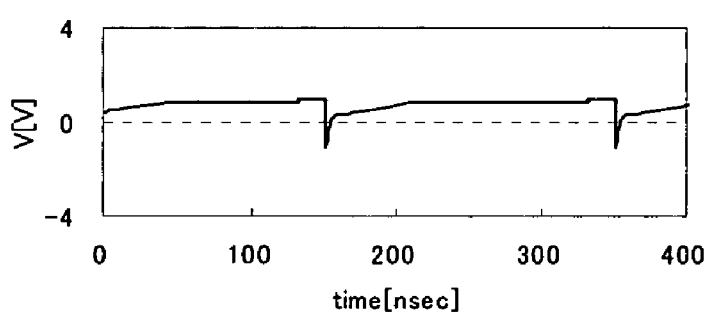
Figure 9D:
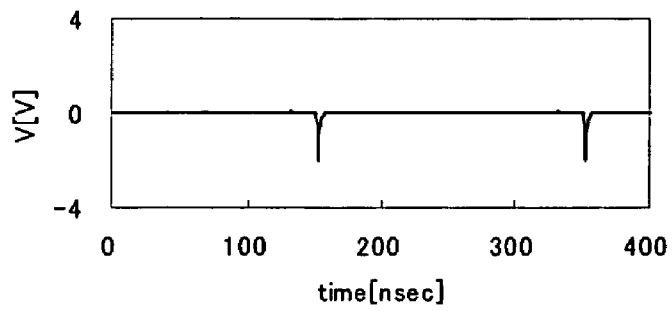
Figure 10A:
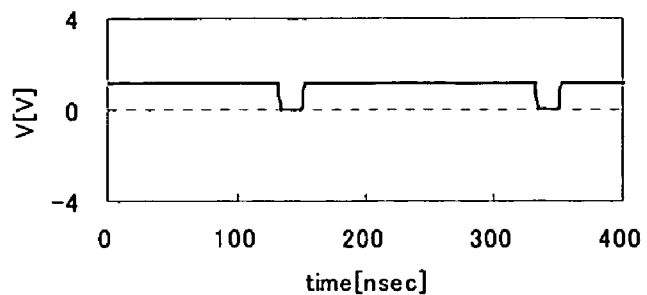
FIG. 10(a) through FIG. 10(d) are diagrams each showing change in voltage over time in accordance with a pulse input signal in the circuit of FIG. 7.
Figure 10B:
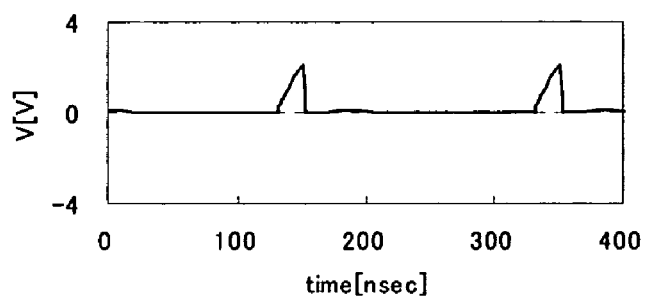
Figure 10C:
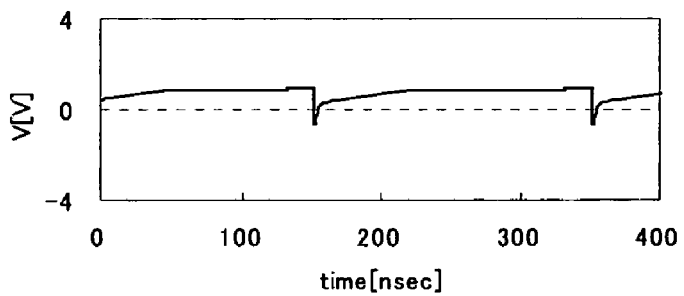
Figure 10D:
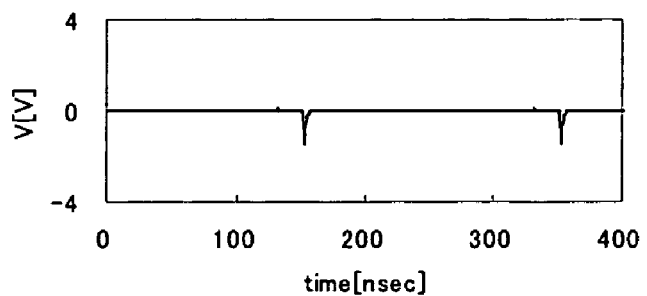

FIG. 9(a) through FIG. 9(d) each show change in voltage at point A through point D when the ON time of the pulse input signal is 180 nsec, and the voltage is 3 v; FIG. 10(a) through FIG. 10(d) each show change in voltage at point A through point D when the ON time of the pulse input signal is 180 nsec, and the voltage is 1.2 v. FIG. 9(a) and FIG. 10(a) show change in voltage at point A; FIG. 9(b) and FIG. 10(b) show change in voltage at point B; FIG. 9(c) and FIG. 10(c) show change in voltage at point C (that is, change in reverse voltage applied to the step recovery diode 51); FIG. 9(d) and FIG. 10(d) show change in voltage at point D (that is, change in the output value of an impulse output from the impulse generating unit 50).

As shown in FIG. 9(a) through FIG. 9(d) and FIG. 10(a) through FIG. 10(d), the output value of impulses generated by the impulse generating unit 50 depends on the ON time and the voltage [see FIG. 9(d) and FIG. 10(d)] of the pulse input signal which is input to the impulse generating unit 50 and whose setting has been changed by the control unit 40 [FIG. 9(a) and FIG. 10(a)].

Here, in comparison with the examples shown in FIG. 9(a) through FIG. 9(d), the examples shown in FIG. 10(a) through FIG. 10(d), in which the voltage of pulse input signal is low, reveals low output values [see FIG. 9(d) and FIG. 10(d)].

In this manner, according to the impulse generating unit 50, the control unit 40 changes setting of the ON time and the voltage of a pulse input signal based on the table 41, thereby obtaining impulses with desired output values according to the ON time and the voltage of the pulse input signal.

That is, the control unit 40 is capable of generating a pulse input signal such that impulses with a desired output value can be obtained by the impulse generating unit 50 based on the table 41.

As described so far, according to the communication device 1 (impulse generator 30) of the present embodiment, the control unit 40 changes a pulse input signal input to the impulse generating unit 50, thereby controlling the output value of impulses generated by the impulse generating unit 50, so that output adjustment for the impulse generating unit 50 can be performed in a stage before the impulse generating unit 50. Therefore, the communication device 1 does not require a mechanism, such as a digital control attenuator, for adjusting an output of the impulse generating unit 50 in a stage after the impulse generating unit 50, which mechanism was necessary in the above-described previous art. Further, an interface (port, etc.) and a control circuit for controlling the digital control attenuator are not required, either. Hence, it is possible to control the output value of impulses with a significantly simple construction.

In addition, since an expensive digital control attenuator, and an interface and a control circuit for controlling thereof are no longer necessary, manufacturing cost will be reduced.

[2] Other Modifications

Further, the present invention should by no means be limited to the above-illustrated embodiment, and various changes or modifications may be suggested without departing from the gist of the invention.

For example, in the above embodiment, the control unit 40 changes the ON/OFF time and the voltage of a pulse input signal input to the impulse generating unit 50 based on the table 41 of the control unit 40. The present invention should by no means be limited to this. The control unit 40 can have a table in which output values of impulses and the ON/OFF times of a pulse input signal are associated with each other. On the basis of the table, the control unit 40 can change only the ON/OFF times of a pulse input signal. Further, the control unit 40 can have a table in which output values of impulses and the voltage of a pulse input signal are associated with each other. On the basis of the table, the control unit 40 can change only the voltage of an impulse input signal.

Figure 11:
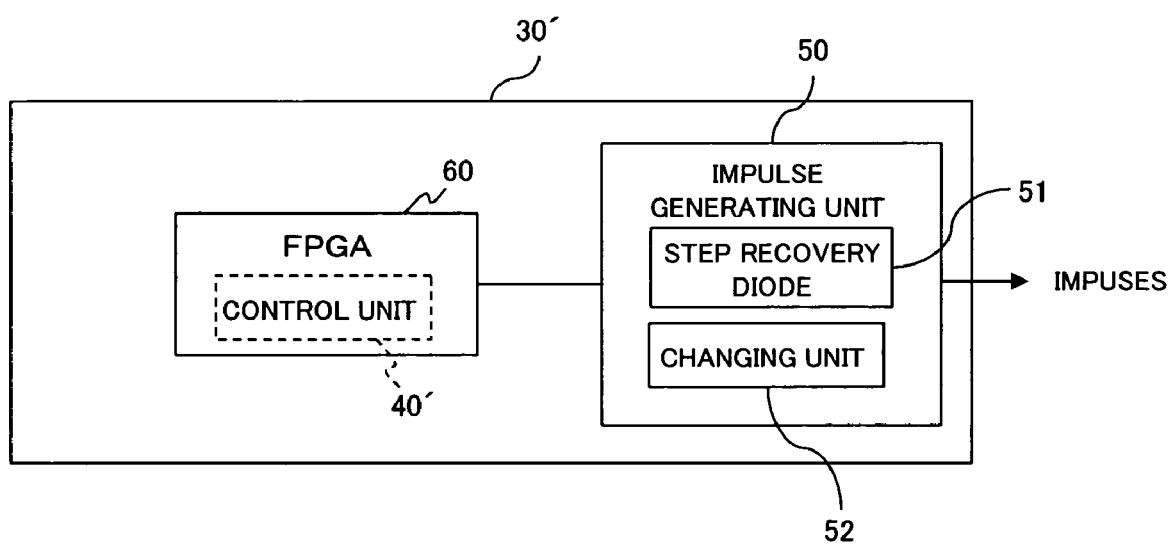
FIG. 11 is a block diagram showing a construction of an impulse generator of a communication apparatus as a modified example of the present invention.

Further, as a modified example of the above-descried embodiment, the function of the control unit 40 can be realized by an FPGA (Field Programmable Gate Array). That is, as shown in FIG. 11, a control unit 40' of an impulse generator 30' is realized by an FPGA (Field Programmable Gate Array) 60. At this time, the ON/OFF time width such that a necessary impulse output is obtained is set in the FPGA 60 beforehand, and a pulse input signal at the constant logic level is applied to the impulse generating unit 50, thereby obtaining impulses with a desired (necessary) output value.

Further, in the above-described embodiment, the description was made, taking an example in which the impulse generator 30 is applied to the communication device 1 employing the UWB-impulse radio communication scheme. However, the preset invention should by no means be limited to this, and the impulse generator 30 is applicable to various systems employing an impulse signal.

The function of the above-described control unit 40 (control unit 40') can be realized by a computer (including a CPU, an information processing device, and various types of terminals) which executes a specified application program (an impulse control program).

The program is recorded in computer-readable recording media such as flexible discs, CDs (CD-ROMs, CD-Rs, and CD-RWs), and DVDs (DVD-ROMs, DVD-RAMs, DVD-Rs, DVD-RWs, DVD+Rs, and DVD+RWs). The computer reads the programs from such recording media to transfer the programs to an internal or external storage device, to store the programs therein. Alternatively, the programs can be recorded in storage devices (recording media) such as magnetic discs, optical discs, and magneto-optical discs, to be transferred to the computer over a communication network.

Here, the "computer" is defined as a concept including hardware and an OS (Operating System), or hardware operating under control of an OS. Further, in cases where hardware is capable of operating by itself without the necessity of an OS, the hardware is equivalent to the "computer." The hardware includes at least a microprocessor such as a CPU and a means for reading computer programs from recording media.

The aforementioned predetermined application programs contain program codes that instruct the computer to function as the control unit 40. Further, a part of those functions can be realized by an OS, not by such application programs.

Moreover, as recording media used in the embodiments of the present invention, not only the above-mentioned flexible discs, CDs, DVDs, magnetic discs, optical discs, and magneto-optical discs, but also various types of other computer-readable media, such as IC cards, ROM cartridges, magnetic tapes, punch cards, internal storage devices (memories such as RAMs and ROMs) of computers, external storage devices, and printed matter with any codes such as barcodes printed thereon, are also applicable.

What is claimed is:
1. An impulse generating device, comprising:
an impulse generating unit which generates impulses;
a control unit which controls an output value of impulses output from said impulse generating unit by changing an input signal that is input to said impulse generating unit for generating impulses, said control unit controlling the output value of the impulses by changing an ON/OFF time of the input signal; and
a table holding therein output values of the impulses generated by said impulse generating unit and the ON/OFF times of the input signal in association with each other, said controlling unit changing the ON/OFF time of the input signal based on said table.

2. An impulse generating device as set forth in claim 1, wherein said control unit controls the output value of the impulses by changing voltage of the input signal.

3. An impulse generating device as set forth in claim 1, wherein said control unit is formed by an FPGA (Field Programmable Gate Array).

4. An impulse generating device comprising:
an impulse generating unit which generates impulses;
a control unit which controls an output value of impulses output from said impulse generating unit by changing an input signal that is input to said impulse generating unit for generating impulses, said control unit controlling the output value of the impulses by changing voltage of the input signal; and
a table holding therein output values of the impulses generated by said impulse generating unit and voltages of the input signal in association with each other,
said control unit changing the input signal based on said table.

5. An impulse generating device as set forth in claim 4, wherein said control unit controls the output value of the impulses by changing an on/of time of the input signal.

6. An impulse generating device comprising:
an impulse generating unit which generates impulses;
a control unit which controls an output value of impulses output from said impulse generating unit by changing an input signal that is input to said impulse generating unit for generating impulses, said control unit controlling the output value of the impulses by changing an on/of time and voltage of the input signal; and
a table holding therein output values of the impulses generated by said impulse generating unit, the ON/OFF times of the input signal, and voltages of the input signal in association with each other,
said control unit changing the input signal based on said table.

7. An impulse generating device comprising:
an impulse generating unit which generates impulses; and
a control unit which controls an output value of impulses output from said impulse generating unit by changing an input signal that is input to said impulse generating unit for generating impulses, wherein said impulse generating unit includes:
a step recovery diode for generating impulses; and
a changing unit which changes reverse voltage input to said step recovery diode at the time of switching from forward bias application to reverse bias application, according to an input signal changed by said control unit.

8. A communication device used in a radio communication system which performs radio communication by a UWB (Ultra WideBand)-impulse radio scheme, said device comprising:
an impulse generating unit which generates impulses used in the radio communication;
a control unit which controls an output value of impulses output from said impulse generating unit by changing an input signal that is input to said impulse generating unit for generating impulses, said control unit controlling the output value of the impulses by changing an ON/OFF time of the input signal; and
a table holding therein output values of the impulses generated by said impulse generating unit and the ON/OFF times of the input signal in association with each other,
said controlling unit changing the ON/OFF time of the input signal based on said table.

9. A communication device as set forth in claim 8, wherein said control unit controls the output value of the impulses by changing an on/of time and voltage of the input signal.

10. A communication device as set forth in claim 8, wherein said control unit is formed by an FPGA (Field Programmable Gate Array).

11. A communication device as set forth in claim 8, wherein said control unit controls the output value of the impulses by changing voltage of the input signal.

12. A communication device used in a radio communication system which performs radio communication by a UWB (Ultra WideBand)-impulse radio scheme, said device comprising:
an impulse generating unit which generates impulses used in the radio communication;
a control unit which controls an output value of impulses output from said impulse generating unit by changing an input signal that is input to said impulse generating unit for generating impulses, said control unit controlling the output value of the impulses by changing voltage of the input signal; and
a table holding therein output values of the impulses generated by said impulse generating unit and voltages of the input signal in association with each other,
said control unit changing the input signal based on said table.

13. A communication device used in a radio communication system which performs radio communication by a UWB (Ultra WideBand)-impulse radio scheme, said device comprising:
an impulse generating unit which generates impulses used in the radio communication;
a control unit which controls an output value of impulses output from said impulse generating unit by changing an input signal that is input to said impulse generating unit for generating impulses, said control unit controlling the output value of the impulses by changing an on/of time and voltage of the input signal; and
a table holding therein output values of the impulses generated by said impulse generating unit, the ON/OFF times of the input signal, and voltages of the input signal in association with each other,
said control unit changing the input signal based on said table.

14. A communication device used in a radio communication system which performs radio communication by a UWB (Ultra WideBand) impulse radio scheme, said device comprising:
an impulse generating unit which generates impulses used in the radio communication; and
a control unit which controls an output value of impulses output from said impulse generating unit by changing an input signal that is input to said impulse generating unit for generating impulses, wherein said impulse generating unit includes:
a step recovery diode for generating impulses; and
a changing unit which changes reverse voltage input to said step recovery diode at the time of switching from forward bias application to reverse bias application, according to an input signal changed by said control unit.

* * * * *

UNITED STATES PATENT AND TRADEMARK OFFICE
CERTIFICATE OF CORRECTION

PATENT NO. : 7,646,825 B2
APPLICATION NO. : 11/403854
DATED : January 12, 2010
INVENTOR(S) : Masafumi Asai et al.

It is certified that error appears in the above-identified patent and that said Letters Patent is hereby corrected as shown below:

Column 11, Line 24, change "on/of" to --ON/OFF--.

Column 11, Line 31, change "on/of" to --ON/OFF--.

Column 12, Line 5, change "on/of" to --ON/OFF--.

Column 12, Line 39, change "on/of" to --ON/OFF--.

Column 12, Line 49, change "WideBand) impulse" to --WideBand)-impulse--.

Signed and Sealed this

Thirteenth Day of April, 2010

David J. Kappos
*Director of the United States Patent and Trademark Office*